(12) United States Patent  
Cabrera et al.

(10) Patent No.: US 7,814,229 B1  
(45) Date of Patent: Oct. 12, 2010

(54) CONSTRAINT-BASED DOMAIN NAME SYSTEM

(75) Inventors: Luis Felipe Cabrera, Bellevue, WA (US); Allan H. Vermeulen, Seattle, WA (US); Marvin M. Theimer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 284 days.

(21) Appl. No.: 12/098,393

(22) Filed: Apr. 4, 2008

(51) Int. Cl.  
*G06F 15/16* (2006.01)
(52) U.S. Cl. .................................. 709/245; 709/228
(58) Field of Classification Search ......... 709/227–228, 709/245, 226  
See application file for complete search history.

(56) References Cited

U.S. PATENT DOCUMENTS

| | | | |
|---|---|---|---|
| 6,154,777 A * | 11/2000 | Ebrahim | 709/227 |
| 6,446,133 B1 * | 9/2002 | Tan et al. | 709/245 |
| 6,976,090 B2 * | 12/2005 | Ben-Shaul et al. | 709/246 |
| 7,340,521 B1 * | 3/2008 | Karandikar et al. | 709/226 |
| 7,499,998 B2 * | 3/2009 | Toebes et al. | 709/225 |
| 2007/0208877 A1 * | 9/2007 | Kelley et al. | 709/245 |
| 2008/0313352 A1 * | 12/2008 | Telesco | 709/245 |

* cited by examiner

*Primary Examiner* — Salad Abdullahi  
(74) *Attorney, Agent, or Firm* — Seed IP Law Group PLLC

(57) ABSTRACT

Systems and methods for providing dynamic DNS host services in regard to resolving a text-descriptive resource names of a network request into network addresses is presented. A network request corresponding to a network resource on the computer network is obtained. The network request comprises a text-descriptive resource name corresponding to the network resource. Resource criteria are also obtained. The resource criteria direct how to resolve the resource name of the network resource to a network address. A network address corresponding to the resource name is then selected according to the obtained resource criteria. Thereafter, the selected network address is returned in response to the network request.

28 Claims, 7 Drawing Sheets

CONSTRAINT-BASED DOMAIN NAME SYSTEM

BACKGROUND

Domain Name Systems (commonly referred to as "DNS") provide a key service on a network, such as the Internet, in translating text-descriptive resource names (that reference network resources) into actual network addresses that usually comprise a series of digits. For example, a computer user may know of an electronic marketplace site on the Internet by the name of "MyHost.com." However, that user will not likely be aware that the Internet address "MyHost.com." is actually (by way of example only)<192.28.1.100>. As is well appreciated, for most people it is usually easier to remember a text-descriptive name, e.g., "MyHost.com," than an actual address, e.g., a series of numbers that have no contextual meaning to a user. The DNS hosts translate the text-descriptive resource name into a corresponding network address for the computer user. DNS hosts have, at their disposal, a table of resource names and corresponding network addresses.

Those skilled in the art will appreciate that users generally do not communicate directly with a DNS host system. Indeed, most users are unaware of communications with a DNS host system. Instead, DNS resolution takes place transparently at the direction of client-applications such as Web browsers or other network-based applications on a client device. More particularly, when a user makes a request for a network resource via a resource name, such as a universal resource locator, or URL, the application with which the user makes the request forwards that request to a DNS system for resolution. FIG. 1A is a pictorial diagram of an illustrative network environment 100 showing various events occurring when a computing device 102 (as operated/directed by a user, not shown) makes a network request for a network resource, such as information from a network site 106. More particularly, by way of example it is assumed that the user requested information from network site 106, and that the network site is known to the user as "www.MyHost.com".

When the request is made by the user via the resource name 103, "www.MyHost.com," rather than a network address, the application (not shown) on the computing device transparently requests a name resolution for the resource name from a DNS host 104, as illustrated by arrow 1. The DNS host 110 resolves the resource name 103 to a network address 105 according to information it stores (or obtains) for mapping resource names to corresponding network addresses. Upon resolution, the network address 105 is returned to the requester application, as indicated by arrow 2. Once the application has the network address, the network request is directed over the network 108 to the network site 106, as indicated by arrow 3.

When a particular entity, such as "MyHost.com", is associated with a single network address, such as suggested in FIG. 1A, DNS resolution (i.e., translating the resource name into a network address) is straightforward. However, many companies and organizations (as well as other types of entities) often maintain multiple network sites, each of which correspond to a unique network address while, desirably, each is addressable using a single resource name. Current DNS systems handle this one-to-many mapping of resource name to network address translation in one of two different ways: (1) according to location (i.e., mapping the resource name to the host site's network address closest to the requesting computer); or (2) balancing network traffic using techniques such as round-robin site selection (i.e., iterating through the various host site's network addresses on a per request basis) or load-balancing selection (i.e., selecting the host's least busy site according to current network traffic). FIG. 1B is a pictorial diagram of an illustrative network environment 150 showing various events occurring when a computing device 152 (as operated by a user, not shown) makes a network request for a network resource, such as information from a host system, as identified by resource name 155 "www.MyHost.com," that has multiple actual network sites, such as sites 156 and 158, on a network 108.

As suggested above, when a user requests information for a network resource using a text-descriptive resource name, the application (not shown) on the computing device transparently requests a name resolution for the resource name 153 from a DNS host 104, as illustrated by arrow 1. The DNS host 110 resolves the resource name 153 to a network address 155 from a plurality of network addresses, according to information it stores (or obtains) for mapping resource names to corresponding network addresses. The DNS host 160 selects network site 156 over network site 158 according to one of the options discussed above (round-robin selection or closest in proximity). Upon resolution, the network address 155 is returned to the requester application, as indicated by arrow 2. Once the application has the network address, the network request is directed over the network 108 to the selected network site 156 corresponding to the requested resource name, as indicated by arrow 3.

Unfortunately, even though current DNS hosts may handle the one-to-many "resource name to network address" translations, the current translation rules implemented by the DNS hosts (as set forth above) are static in nature and do not accommodate the flexibility and dynamic configurability that would be highly useful and desirable in today's marketplace.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While the disclosed subject matter is made in regard to a single, logical DNS host system to map resource names to network addresses, those skilled in the art will appreciate that DNS name resolution occurs in a distributed and hierarchical manner that may involve several distinct entities. However, while multiple host/computer systems may be involved with resolving a resource name to a network address, the DNS resolution may be viewed as being performed by a single logical entity for purposes of illustrating the novel aspects of the disclosed subject matter. Accordingly, and for the sake of simplicity in description, the present discussion will be made with make with regard to a single, logical DNS host that resolves resource names to network addresses.

As part of addressing the static nature of DNS "resource name to network address" translations, disclosed herein is a dynamic logical DNS system for resolving a resource name into a network address according to dynamic, configurable criteria, as well as methods for "resource name to network address" translations according to dynamic criteria. Generally speaking, and as will be more further clarified in the various embodiments set forth below, a DNS host receives a resource name for translation, and further obtains resolution criteria for dynamically controlling how the DNS host will resolve the resource name to a corresponding network address. More particularly, the resolution criteria guides the DNS host in selecting one of a plurality of potential network addresses for a given resource name.

It should be appreciated that the disclosed subject matter, particularly dynamically configuring a DNS host to resolve "resource name to network address" translations according to resolution criteria, is beneficially used when there is more than one network address corresponding to a single resource name. However, a DNS host configured according to the disclosed subject matter will satisfactorily operate when there is a one to one correspondence between resource names and network addresses.

Figure 1A:
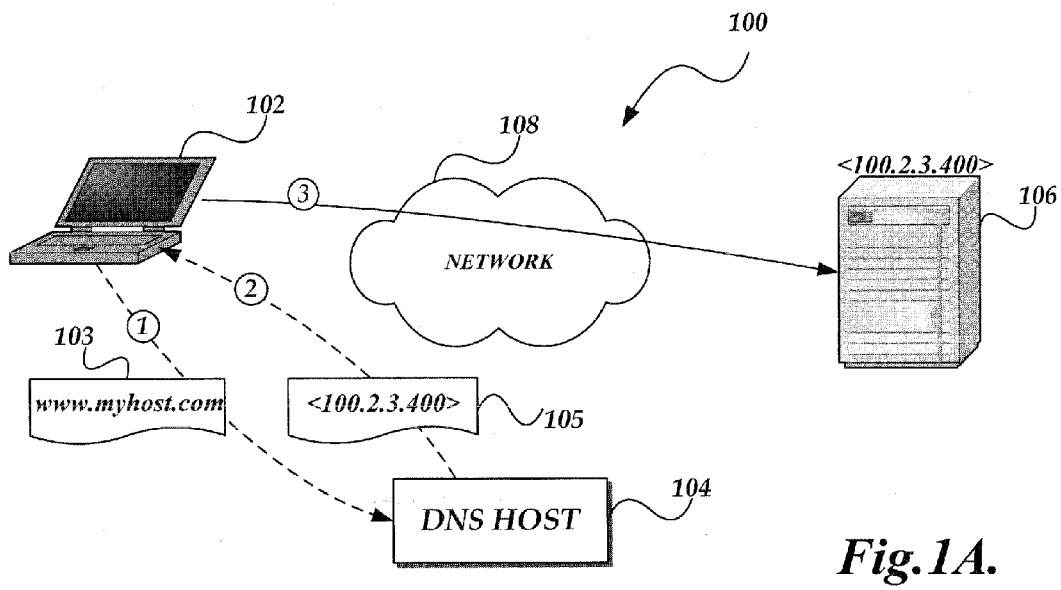
FIGS. 1A and 1B are pictorial diagrams of exemplary network environments illustrating showing various events occurring when a computing device (as operated by a user) makes a network request for a network resource.
Figure 1B:
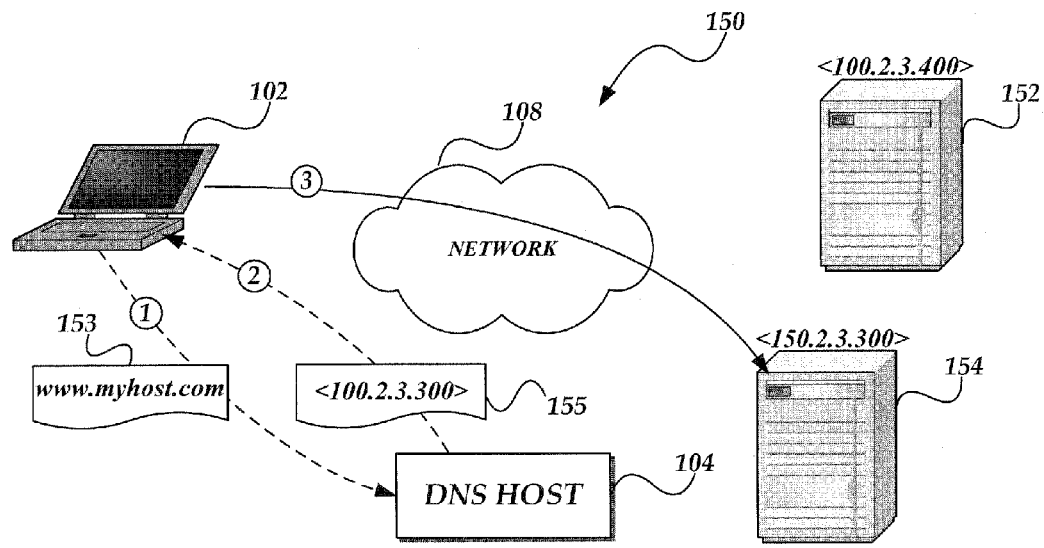
Figure 2:
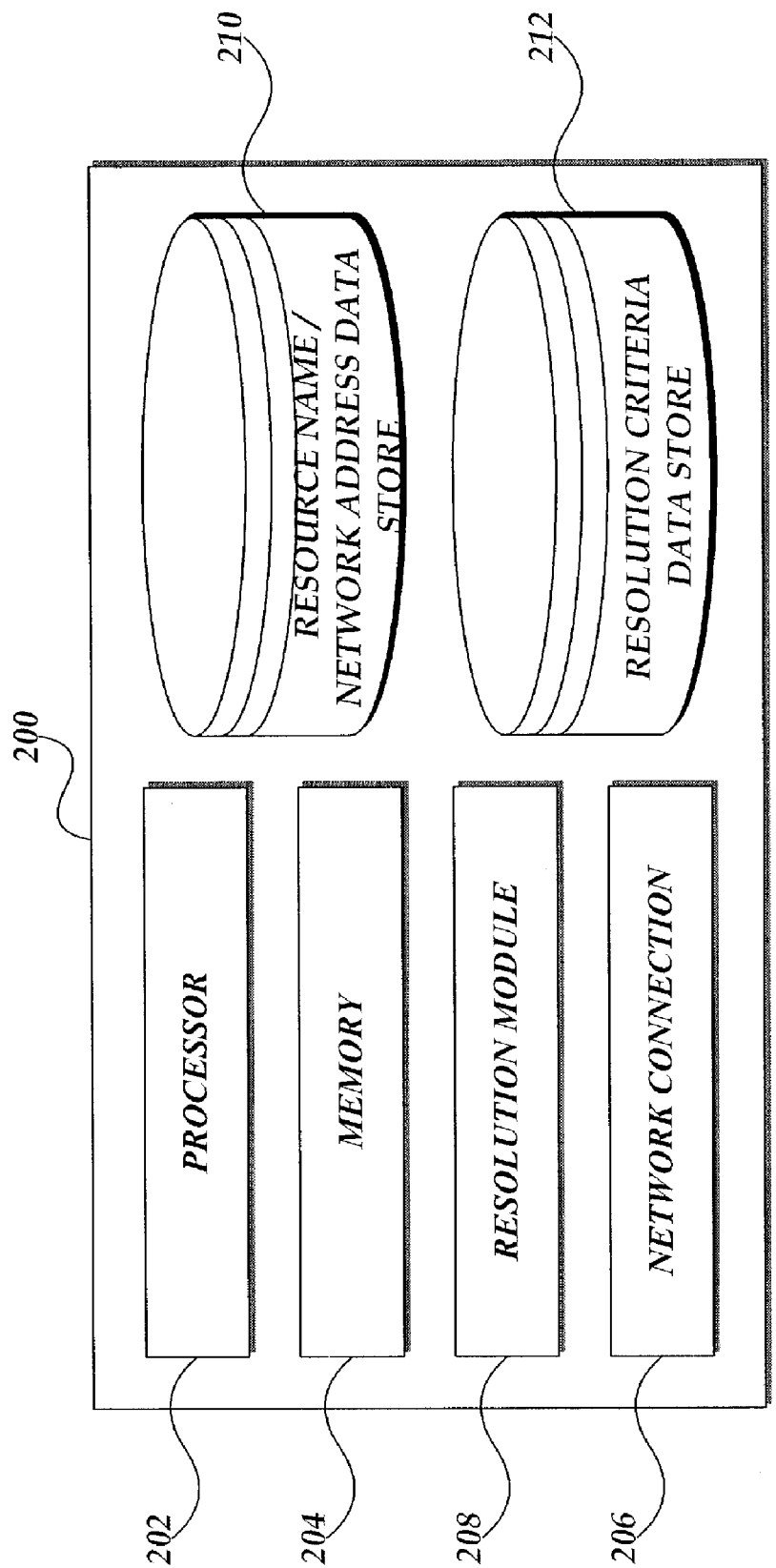
FIG. 2 is a block diagram of an illustrative DNS host configured according to aspects of the disclosed subject matter.

FIG. 2 illustrates various components of an illustrative DNS host system 200 configured according to aspects of the disclosed subject matter. More particularly, the DNS host system 200 includes a processor 202, a memory 204, a network connection 206, and a resolution module 208 for resolving resource names to network addresses according to obtained resolution criteria. As those skilled in the art will appreciate, the processor executes one or more instructions to carry out various functions, including resource name to network address resolution, on the DNS host system 200. Moreover, while the illustrated DNS host system 200 illustrates a single processor 202, this is for illustration purposes only and should not be viewed as limiting upon any particular embodiment. In various embodiments, a suitable configured DNS host system 200 may include a plurality of processors that cooperatively operate to resolve name to network address translations.

The network connection 206 interfaces the DNS host system 200 with a network, such as the Internet. Via the network connection 206, the DNS host system receives requests for network addresses of specified resource names and returns its responses (network addresses) to the requests.

As mentioned above, the resolution module 208 resolves or translates the resource names into network addresses according to obtained resolution criteria. Resolving resource names into network addresses may include determining particular conditions or states of network sites or the network itself in response to a request to resolve a resource name into a network address. While shown as a separate module, it should be appreciated that in one embodiment, the resolution module 208 may be implemented as an executable software module for execution by the processor 202 that may be stored in the memory 204. Alternatively, the resolution module may be implemented as a hardware component and/or a combination of hardware and software. Still further, while the resolution module 208 is illustrated as comprising a single module, this is for illustration purposes and should not be construed as limiting upon the disclosed subject matter. Indeed, a single resolution module should be viewed as a logical module that may be comprised of multiple sub-components, each performing one or more tasks in resolving resource names to network addresses.

In various embodiments, those skilled in the art will appreciate that memory 204 includes both volatile memory such as random access memory (or RAM) as well as non-volatile memory such as read-only memory (or ROM), programmable read-only memory (or PROM), hard disk drive storage, flash memory storage, and the like.

Also shown in the illustrative DNS host system 200 is a resource name/network address data store 210 and an optional resolution criteria data store 212. The resource name/network address data store, as indicated above, includes information that associates a resource name with one or more network addresses. While shown as an element of the DNS host system 200, this is illustrative and not limiting as the resource name/network address data store 210 may be implemented external to the DNS host system such that the DNS host system is communicatively coupled to the name/network address data store.

As previously mentioned, the resolution criteria data store 212 is an optional data store that stores default resolution criteria information (profiles) corresponding to users, domains, administrative units, and the like. In one embodiment, the resolution criteria in the resolution criteria data store 212 would be consulted when other resolution criteria is not supplied with a particular request to resolve a resource name into a network address, or if particularly requested to apply such default resolution criteria. Moreover, as with the resource name/network address data store 210, the resolution criteria data store 212 may be implemented as an external component to which the DNS host system 200 is communicatively coupled. Still further, both the resource name/network address data store 210 and the resolution criteria data store 212 are illustrated as being databases. However, this is illustrative and should not be viewed as limiting. For example, the information in these data stores may be implemented as tables in a file, linked lists, and the like.

While the DNS host system 200 is shown as being a single, integrated system, those skilled in the art will appreciate that in various embodiments, the DNS host system may be implemented on multiple computing devices that are communicatively coupled to each other. Still further, while the illustrative DNS host system 200 is shown as comprising only a few discrete components, it will be appreciated by those skilled in the art that a DNS host system may and will likely comprise other components including, by way of example only, a keyboard, a mouse, a display device, and the like.

The DNS host system 200 may obtain resolution criteria in a number of manners. These include obtaining resolution criteria as part of (or associated with) the request to resolve a resource name into a network address, or from the resolution criteria data store 212 mentioned above. Moreover, resolution criteria obtained as part of the request for name/address resolution may originate from a variety of sources. In a first instance, a computer user may explicitly indicate resolution criteria with regard to a particular network request. In other words, a user may particularly specify resolution criteria to apply with regard to a particular network data request from a network site, such as "MyStore.com." A particularly adapted information retrieval program, such as a Web browser on the user's computer, would permit the user to enter particular resolution criteria that may include indicators to resolve the resource name to a network address having the highest bandwidth, the lowest latency, the least cost, and the like (as described below.) Further, that same information retrieval program may alternatively or additionally be designed to allow a user to provide default resolution criteria such that when the user fails to particular specify resolution criteria for a particular network data request, the program would supply the user's default resolution criteria with the network request.

As further indicated above, the resolution criteria data store 212 may store default resolution criteria for a particular computer user and/or domain such that it may be used in various settings including when a user fails to provide resolution criteria with a request, upon specific request, and the like. In addition to a particular user providing resolution criteria, in administered network, an administrator may configure a router, firewall, or other device to provide resolution criteria to the DNS host system 200 in place of, in the absence of, or in addition to resolution criteria from a computer user. Those skilled in the art will appreciate that the various computer systems can be configured in a variety of manners to provide resolution criteria to a DNS host system 200 such that name/network address resolution is implemented in a dynamic, flexible manner.

Turning now to the resolution criteria that may be provided with name to network address translations, there are various types of resolution criteria. These resolution criteria include latency, bandwidth, financial costs, as well as more general criteria based on business arrangements, domains, countries, language support, social groups, and the like, as described in greater detail below. Further, a particular name to network address translation request may include a combination of multiple resolution criteria, indicating to the DNS host system 200 a desire to resolve the address according to multiple criteria. In some embodiments, certain resolution criteria may be weighted according to user preference. Further still, logical operators, such as various Boolean operators including AND, OR, XOR, and NOT, as well as numerical comparisons and condition statements such as IF/THEN/ELSE may be used to further specifically control how a DNS host system 200 resolves a name to network address translation.

Latency resolution criterion corresponds to a request to resolve a name to network address according to a corresponding network site with the lowest latency time. Lowest latency may be determined according to static information stored at the DNS host system 200 regarding the various network sites from which the DNS host system can select or, alternatively, may be information that is periodically updated at the DNS host system and/or dynamically determined at the time that the request to translate the resource name to a network address is made.

Bandwidth resolution criterion corresponds to a request to resolve a name to network address according to a corresponding network site with the highest available bandwidth. In contrast to latency where the desire is to get a speedy response, highest bandwidth is directed to requesting a network site that has the greatest capacity to provide information to the user. As with latency resolution criteria, highest bandwidth may be determined according to static information stored at the DNS host system 200 regarding the various network sites from which the DNS host system can select or, alternatively, may be information that is periodically updated at the DNS host system and/or dynamically determined at the time that the request to translate the resource name to a network address is made.

Financial costs resolution criterion corresponds to a request to resolve a name to network address according to the lowest cost, typically (but not exclusively) lowest cost per byte of information transferred. Various factors may play into determining the financial costs of a transfer including (by way of example only) the bandwidth of the site, the time of day, the carrier cost of the data transmission, and the like. Similar to latency and bandwidth resolution criteria, financial costs resolution criteria may be statically based, stored at the DNS host system 200, or dynamically determined at the time that the DNS host system resolves the name to network address translation.

Further still, general resolution criteria may specify any number of attributes associated with one or more network sites for directing the DNS host system 200 to resolve the name to network address translation in a user-specified manner. For example, a user may specify that a resource name be resolved according to a site that is presented in Spanish since the user speaks Spanish as a first language. Alternatively, a user may wish to be directed to a particular charity's web site that is hosted in the user's home state. Indeed, attributes may be based on any number of factors that include, by way of illustration only, business arrangements, language, administrative domains, states, countries, regions, specialty, and the like.

As indicated above, a name to network address translation request may be accompanied with a plurality of resolution criteria. For example, as a user intends to download large data files from a network site, and since the user speaks Spanish as a first language, the user's request for the network site may be accompanied with resolution criteria specifying bandwidth and Spanish. Moreover, the criteria may be connected via the Boolean operator "AND".

In addition to receiving resolution criteria with a resource name, a DNS host system 200 may receive and store resolution criteria for various users and/or entities that can be referenced and used to resolve a name to network address. More particularly, the DNS host system 200 may store one or more sets of predetermined resolution criteria for a user or an entity and apply that set of resolution criteria to a name to network address translation when directed.

A DNS host system 200 may store network information regarding networks and network sites that can be used when resolving a name to network address translation according to resolution criteria. For example, the DNS host system 200 may store information indicating that Network Site A is accessible only via a low bandwidth network connection, or maintain a schedule for network transmission costs. Alternatively, the DNS host system 200 may obtain the network information dynamically, i.e., at or about the time of receiving a resource name to translate to a network address. In regard to dynamically obtaining resolution criteria for resolving a name to network address, the DNS host system may be able to determine/observe the information by itself or, in some situations, the DNS host system may need to query the network sites and/or transmission networks and provide callback information such that the DNS host system can determine the information to resolve the name to network address translation.

Figure 3A:
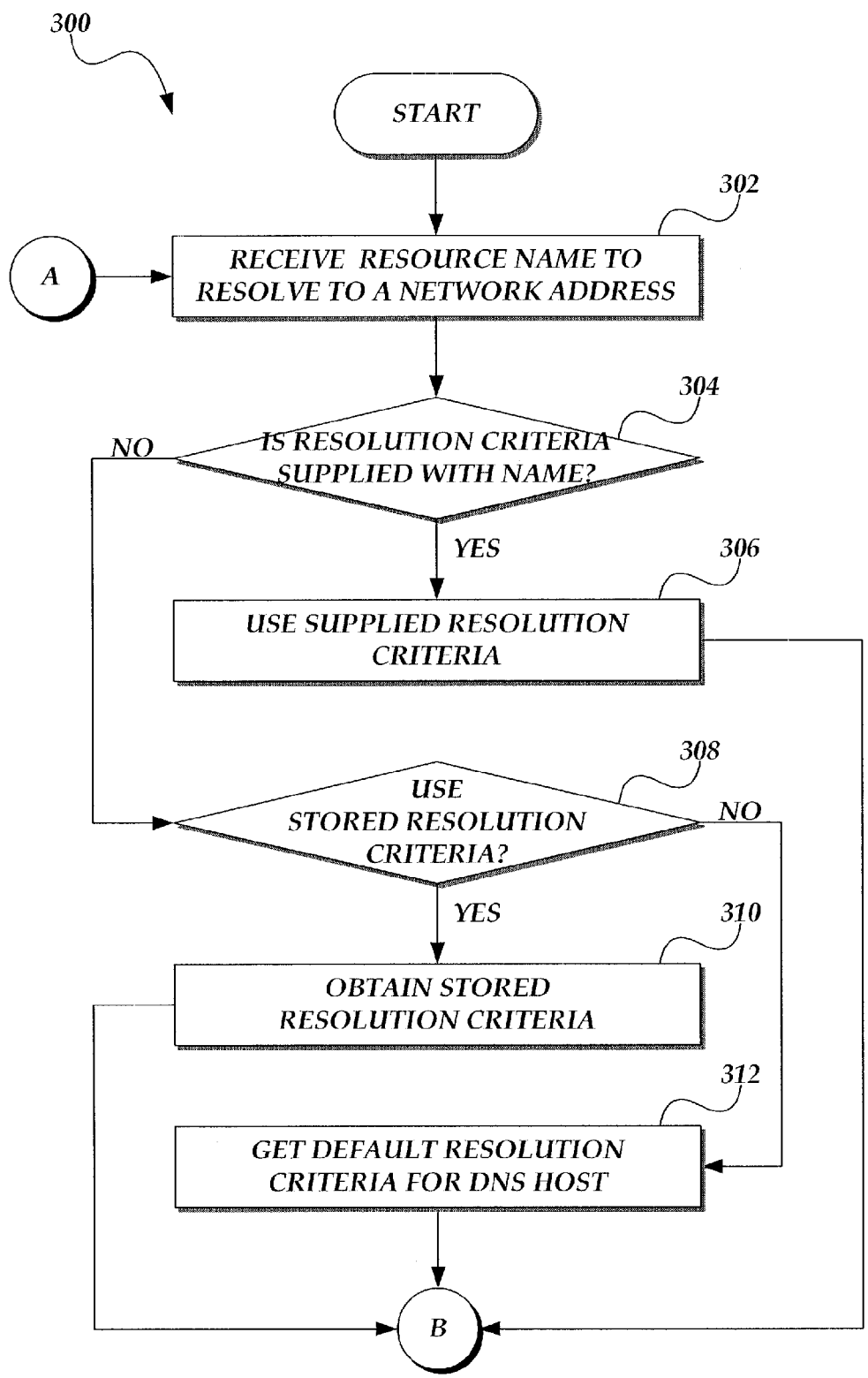
FIGS. 3A and 3B represent a flow diagram of an illustrative routine suitable for a DNS host system, such as described in FIG. 2, to resolve a name to network address translation in accordance with aspects of the disclosed subject matter.
Figure 3B:
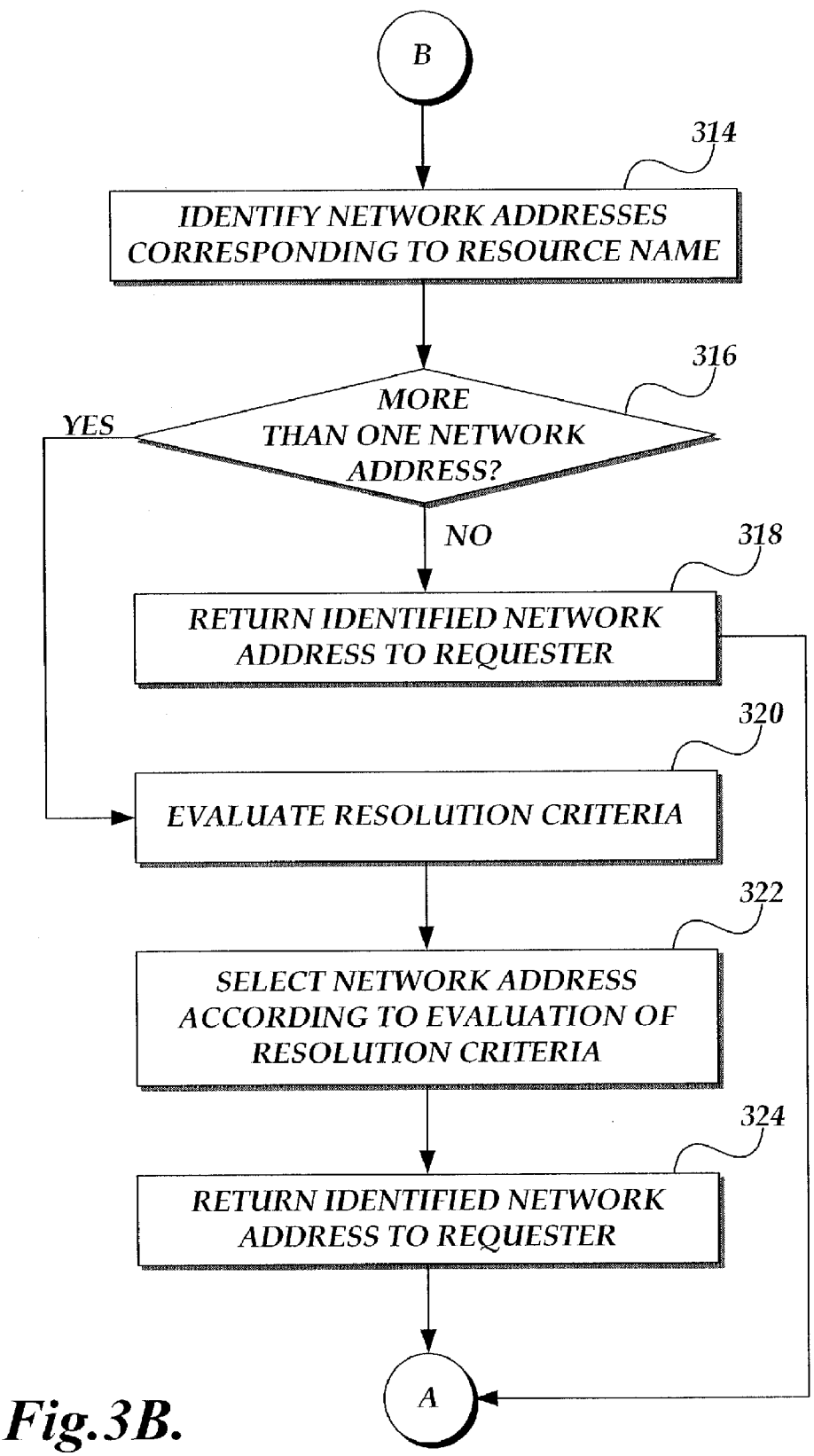

Turning now to flow diagrams for resolving name to network address translation, FIGS. 3A and 3B represent a flow diagram illustrating an exemplary routine 300 for a DNS host system to resolve a name to network address translation. Beginning at block 302 (FIG. 3A), a resource name for translation/resolution to a network address is received. At decision block 304, a determination is made as to whether the resource name was accompanied by resolution criteria. As mentioned above, the resolution criteria may have originated from the computer user as explicitly supplied resolution criteria, from the user's browser as default resolution criteria, from an administration entity or administered device, or so on.

If the received resource name is accompanied with resolution criteria, either as arguments to the resource name or as additional data, the routine proceeds to block 306 to use the supplied resolution criteria. Alternatively, at decision block 308 the DNS host system determines whether the received address includes a directive to use a set of resolution criteria previously established with the DNS host system. If so, at block 310 the DNS host system retrieves that set of predetermined resolutions criteria for use in resolving the resource name to a network address.

While not shown, in an optional step, if there is not supplied resolution criteria or a directive to use preconfigured/predetermined resolution criteria, the DNS host system may attempt to determine the identity or domain of the user that submitted the resource name and select resolution criteria associated with that user and/or domain.

If the DNS host system 200 is unable to obtain resolution criteria, at block 312 the default resolution criteria for the DNS host system is obtained. Once resolution criteria is obtained (irrespective of the source), at block 314 (FIG. 3B) the DNS identifies the network address or addresses that correspond to the received resource name. At decision block 316, a determination is made as to whether there is more than one corresponding network address. If not, the routine 300 proceeds to block 318 where the DNS host system returns the single identified network address that corresponds to the resource name to the requestor responsive to the network request. Thereafter, the routine 300 returns to block 302 to process additional network requests that may be received.

If there are multiple network addresses corresponding to the received resource name, at block 320 the obtained resolution criteria is evaluated. Evaluation of resolution criteria may comprise making determinations as to network transmission, costs, current latencies and bandwidth, parsing the resolution criteria to determine how it will affect the selection of a network address, and the like. In short, evaluating resolution criteria provides the information to the DNS host system 200 to select which of the available network addresses to select. Thus, at block 322, the DNS host system 200 selects a network address according to the evaluated resolution criteria. Thereafter, at block 324, the DNS host system 200 returns the selected network address to the requestor in response to the network request. The routine 300 then returns to block 302 to process additional network requests that may be received.

Figure 4:
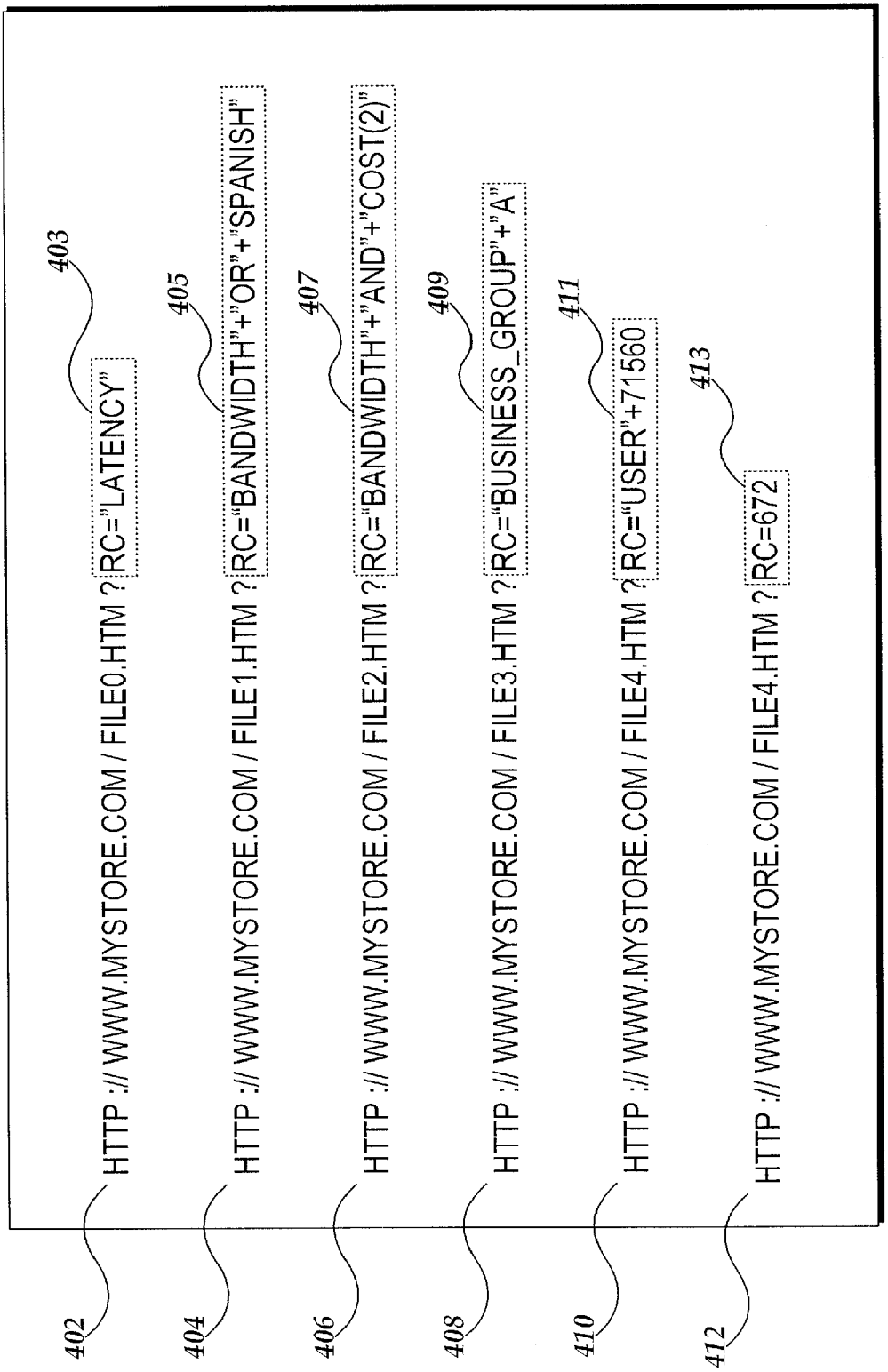
FIG. 4 is a block diagram of illustrative network requests based on a resource name and further including resolution criteria for use by a DNS host in translating the resource name to a network address.

Turning now to providing resolution criteria with a network request, while there are several manners for delivering such information to a DNS host system 200, one such manner is to include/attach the resolution criteria to or as part of the uniform resource identifier (or URI) that forms a particular network request. More particularly, resolution criteria may be appended to a URI (or a uniform resource locator or URL) as an argument (or one of many arguments) which is typically signaled by a "?" at the end of the URI. To that end, FIG. 4 includes several illustrative URIs 402-412 that have resolution criteria appended to the end of the network request. Each of these URIs includes resource criteria (or criterion) that begins with "RC=" which signifies that this particular argument is resource criteria. However, it should be appreciated that this particular format is for illustration purposes only and should not be viewed as limiting on the disclosed subject matter. Those skilled in the art will appreciate that any number of signifiers and/or formats may be used to indicate the presence of resolution criteria as an appendage to a URI or URL, each of which is contemplated as falling within the scope of this disclosure.

In regard to URI 402, as mentioned above, resolution criteria may be based on a single attribute. In the case of URI 402, the resolution criterion is latency, as illustrated by the text string 403, meaning that the DNS host system 200 should resolve the resource name "mystore.com" to a network address according to which has the best latency. Character strings (as used in these examples), tokens, numeric values, and the like, may each be used to indicate a particular dynamic resolution attribute such as latency. Accordingly, the use of character strings should be viewed as illustrative and not limiting.

In contrast to URI 402, URI 404 includes multiple resolution criteria for a DNS host system 200 to consider. In the case of URI 404, the resolution criteria is to be based on bandwidth or that the network site is a Spanish language site, as illustrated by the text string 405. This particular example, aside from setting forth multiple criteria upon which the DNS host system is to resolve name to network address translation, also illustrates an exemplary use of a Boolean operator, "OR", indicating that the DNS host system can optionally choose between bandwidth or a Spanish-speaking network site. Moreover, those skilled in the art will appreciate that the "+" symbols between the various criterion and operators indicates the presence of additional "tokens" to the resource criteria. As above, however, this is illustrative and should not be viewed as limiting on the disclosed subject matter.

URI 406 indicates that the name to network address resolution of the name "mystore.com" is to be determined according to bandwidth and according to least cost, as shown in the character string 407. Moreover, this URI further demonstrates an illustrative manner in which weighting or preference may be specified: including the "(2)" at the end of cost to indicate that costs (if applicable) should be weighted double over bandwidth concerns.

The resolution criteria for URI 408, as found in string 409 is one example of how a user might specify a general category and a corresponding value for that category. In this example, "BUSINESS-GROUP" corresponds to a category known to the DNS host system and the string "A" represents the value for the business group category to limit the results.

URI 410, as shown in string 411, illustrates how a user or entity may request the use of a set of predetermined resolution criteria on a DNS host system. In particular, the string "USER" may be a key word that indicates that the DNS host system should use a predetermined resolution criteria set it has stored corresponding to a user. In this example, the value 71560 indicates the particular user (and/or entity) for which the DNS host system should find a stored resolution criteria set. While not shown, if multiple criteria sets are available for the user/entity, a further indicator may be needed to specify which set to use.

URI 412, as shown in string 413, corresponds to a predetermined set of rules stored by the DNS host system that may or may not be associated with a user. More particularly, in this example, a DNS host system may offer a variety of resolution rule sets from which a user may selectively choose.

Of course, it should be appreciated that URIs 402-412 are illustrative in regard to their form, and those skilled in the art will appreciate that there are numerous formats, tokens, and the like that can be used according to design preferences. Thus, these examples should be viewed as illustrative and not limiting, and other representations of resolution criteria should be viewed as falling within the scope of the disclosed subject matter.

As mentioned above, a user may supply resolution criteria in regard to a specific network request by explicitly indicating the desired criteria. For example, a suitably configured Web browser may provide the ability for a user to specify particular resolution criteria in regard to a specific network request. Alternatively, the Web browser may be configured to store the user's default resolution criteria and append that criteria to each network request.

Figure 5:
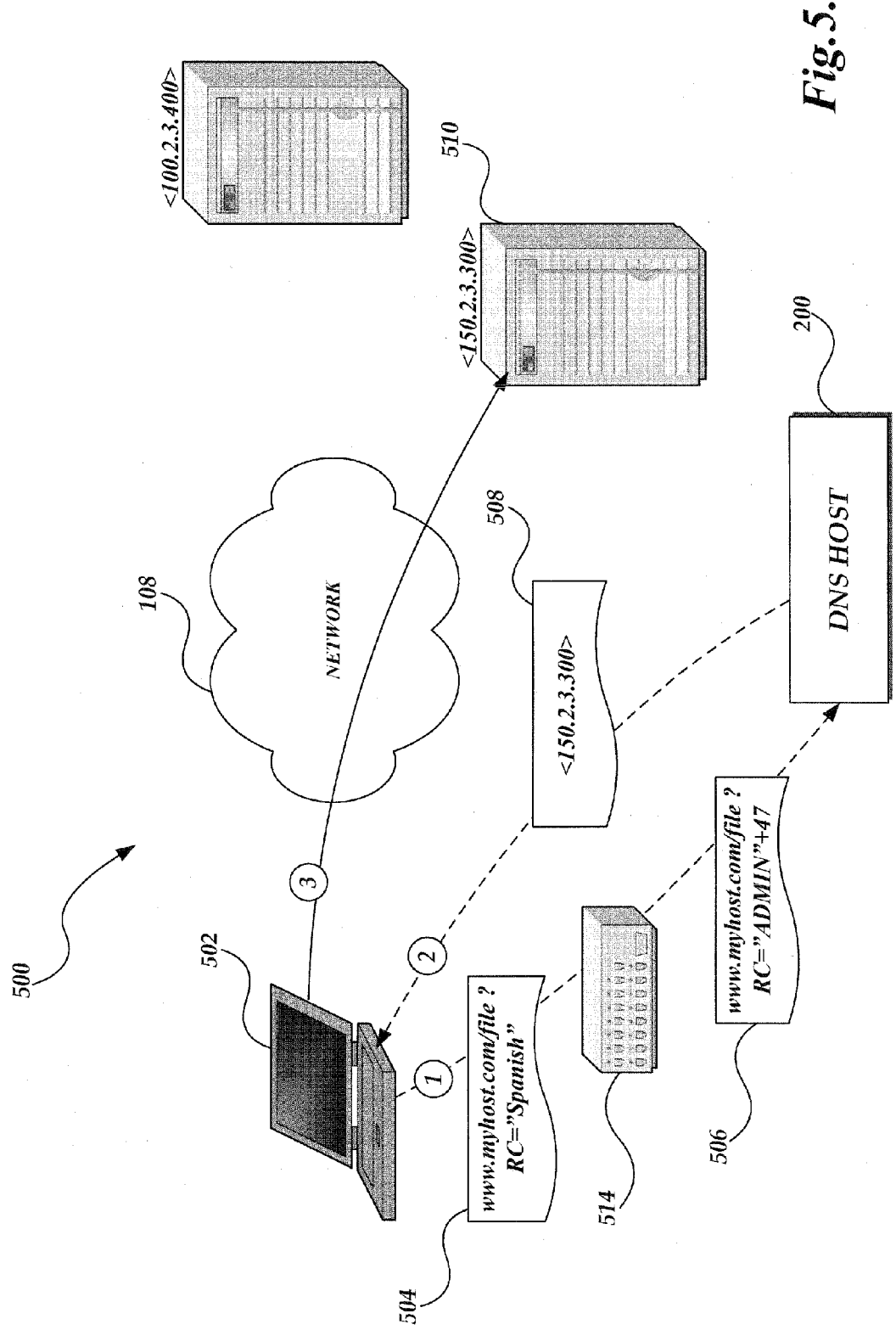
FIG. 5 is a block diagram illustrating how an administrative/proxy entity may control the resolution criteria for name to network address translation for its members.

Still further, while a user may supply his/her own resolution criteria, an administrator responsible for network requests may wish to override and/or supplement the user's resolution criteria according to various criteria, such as corporate policy and the like. More generally, a user's resolution criteria may be transparently modified and/or replaced as the network request passes through one or more proxies during resource name to network address resolution. To that end, FIG. 5 is a block diagram 500 illustrating how an entity may control the resolution criteria for name to network address translation for its members. For example, a user on a computing device 502 within a sub-network submits a network request 504, as indicated by arrow 1. Since this network request 504 includes a resource name that requires resolution, this network request is directed to a DNS host 200. In this example, the DNS host 200 lies outside of the administered sub-network and, therefore, must pass through a proxy device 506. Further in this example, the network request 504 includes resolution criteria for Spanish language support as specified by the user.

As this network request must pass through the proxy device 506, the proxy device may be suitably configured to modify network requests. More particularly, proxy devices, such as proxy device 506, can modify, substitute, or augment resolution criteria according administered preferences. In this case, the proxy device 506 modifies the network request 504 to indicate that a predetermined set of resolution criteria, corresponding to an administrator as specified by identifier "47", should be used. The updated network request 506 is forwarded to the DNS host 200 for processing as described above, and the selected network address 508, as resolved by the DNS host 200 according to the updated resolution criteria, is returned to the requesting application, as indicated by arrow 2. Thereafter, the computing device makes the network request to the host 510 corresponding to the selected network address, as indicated by arrow 3.

As a variation of the above (not shown), the user's resolution criteria may be appended to the administration group's resolution criteria to the extent that they do not conflict.

As earlier described, current DNS systems operate in accepting a text-descriptive resource name and returning a network address which is then used as the destination of a network request. While current DNS hosts, such as host 200, may be configured to accept resolution criteria, many aspects of the disclosed subject matter may be implemented without changing the fundamental operation of a DNS host as set forth below.

Figure 6:
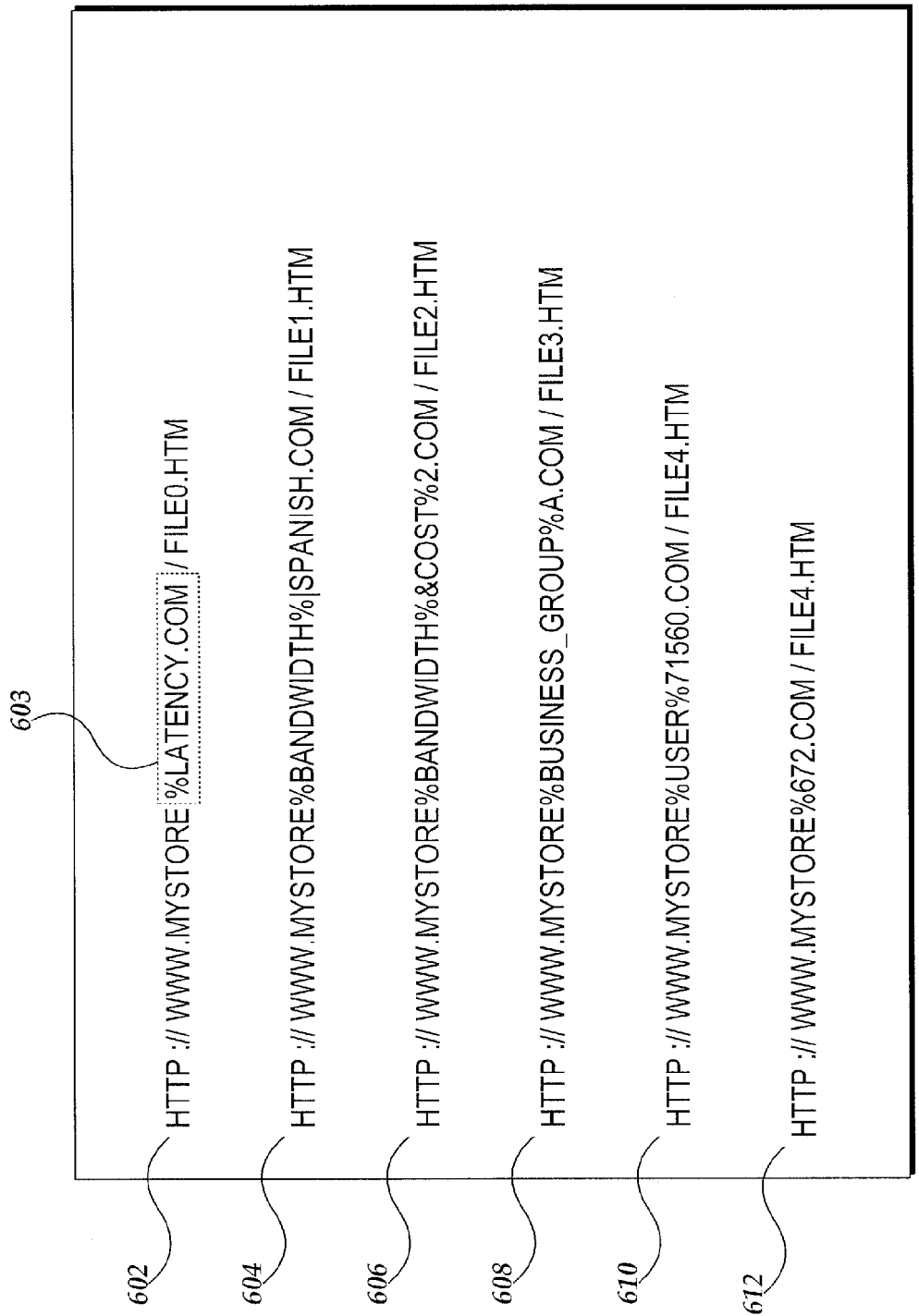
FIG. 6 is a block diagram of illustrative network requests, corresponding to those of FIG. 4, for illustrating how the resolution criteria may be embedded within the resource name.

In a first embodiment that does not require modification of a DNS host 200, the user application that generates a network request, such as a browser or DNS operating system services, may integrate the resource criteria to the network resource's resource name. By way of example, FIG. 6 includes several illustrative URIs 602-612 that have resolution criteria integrated within the resource name of the network request, that correspond to the URIs 402-412 of FIG. 4. In contrast to URIs 402-412 which append the resource criteria with the "RC" argument, URIs 602-612 incorporate the resource criteria as part of the resource name. To do so, by way of example the character, "%", is used as a "signal" or escape sequence such that a DNS host 200 may recognize the resource criteria. For example, URI 602 includes the resource criteria "Latency", as shown in box 603, which is signaled by the token/character "%". Of course, those skilled in the art will appreciate that the use of the character "%" as an indication of resource criteria is just an example of tokens and/or characters that may be used to indicate the presence and delineation of resource criteria in a resource name. Accordingly, the examples shown in FIG. 6 should be viewed as illustrative only, and not construed as limiting upon the disclosed subject matter.

As an alternative to embedding the resource criteria within the resource name, an alternative approach is to configure the user's application or some service other than the DNS host 200 to "pre-process" the network resource request, particularly when resource criteria are to be used. By way of illustration only, DNS services on an operating system may be configured to pre-process a network resource request when the request includes resource criteria. Pre-processing the network request would likely include evaluating the resource criteria and determining whether the network resource request, in view of the resource criteria, corresponds to a particular resource name. A local cache of resource name information may be maintained (at the pre-processing location) to enabling the pre-processing to substitute the user-supplied resource name with an alternative resource name that is consistent with the user-supplied resource criteria. For example, assuming that the URI 402 (FIG. 4) could resolve to several network addresses, the pre-processing service may have locally cached information to the effect that one of the several network addresses has better response times than the others and substitute the resource name supplied by the user with the resource name that specifically identifies the network resource with the best response times. Further still, in addition to cached information, the pre-processing service may dynamically determine information necessary to satisfy a set of resource criteria before performing a substitution.

While the above example suggests that the DNS services of the operating system are configured to handle the pre-processing of the resolution criteria, this should be viewed as merely illustrative, and not construed as limiting upon the disclosed subject matter. Indeed, in alternative embodiments, the user application that makes the network resource request, proxy servers, and the like may be configured to pre-process the network resource request according to resolution criteria. Additionally, one of the advantages of pre-processing a network request is that the pre-processing service may use the services of existing DNS hosts as well as accommodate user-supplied resolution criteria. In this manner, very little disruption with regard to existing DNS services is required.

As those skilled in the art will appreciate, the pre-processing actions described above rely upon existing, or legacy, DNS services to complete a process of translating a resource name into a network address. Since information is likely cached at the pre-processing service, another alternative is for the pre-processing service to evaluate the resolution criteria and maintain its own local cache of network addresses for corresponding resource names. Further still, this pre-processing service could, rather than returning the network address to the requesting application, simply redirect the network request to the network address determined according to the resolution of the resource criteria.

While illustrative embodiments have been illustrated and described, it will be appreciated that various changes can be made therein without departing from the spirit and scope of the invention. Moreover, while methods have been described, in addition to their execution on a DNS host system, instructions for carrying out the methods may be alternatively The embodiments of the invention in which an exclusive property or privilege is claimed are defined as follows:

1. A computer system for providing DNS host services, the system comprising:
    a processor;
    a memory;
    a network connection communicatively connecting the computer system to a computer network; and
    an executable resolution module for resolving resource names into network addresses according to obtained resource criteria;
    wherein the computer system, in executing the resolution module, is configured to:
        receive a network request corresponding to a network resource on the computer network, wherein the network request includes a text-descriptive resource name corresponding to the network resource, and wherein the network request further includes information indicating resource criteria and one or more operators, the indicated resource criteria and one or more operators for use by the computer system in resolving the resource name of the network resource to a network address in place of default selection procedures on the computer system for the resolving of the resource name;
        perform the resolving of the resource name in accordance with the indicated resource criteria and one or more operators in place of the default selection procedures by selecting one of a plurality of network addresses corresponding to the resource name, the performing of the resolving of the resource name including applying the one or more operators to the at least some of the indicated resource criteria to control how the indicated resource criteria are used to select the one network address; and
        return the selected one network address in response to the received network request.

2. A computer system for providing DNS host services, the system comprising:
    a processor;
    a memory;
    a network connection communicatively connecting the computer system to a computer network; and
    an executable resolution module for resolving resource names into network addresses according to obtained resource criteria;
    wherein the computer system, in executing the resolution module, is configured to:
        obtain a network request corresponding to a network resource on the computer network, the network request including a text-descriptive resource name corresponding to the network resource and further including resource criteria data, the resource criteria data including a plurality of directives for controlling the computer system in resolving the resource name to a network address and including one or more operators corresponding to the plurality of directives;
        select a network address corresponding to the resource name according to the obtained resource criteria data by applying the one or more operators to one or more of the plurality of directives to control how the computer system uses the plurality of directives to perform the selectins of the network address; and
        return the selected network address in response to the obtained network request.

3. The computer system of claim 2, wherein the resource criteria data is appended to the network request as an argument to the network request.

4. The computer system of claim 2, wherein the one or more operators include a Boolean operator to be applied to one or more directives of the plurality of directives for controlling the computer system in resolving the resource name to a network address.

5. The computer system of claim 2, wherein the one or more operators include a weighting operator to be applied to a directive of the plurality of directives such that the weighted directive receives enhanced consideration in resolving the resource name to the network address.

6. The computer system of claim 2 further comprising a resolution criteria data store storing a plurality of sets of resolution criteria, and wherein the resource criteria data includes a token identifying one of the sets of resolution criteria in the resolution criteria data store.

7. The computer system of claim 2 further comprising a name/network address data store, and wherein the computer system selects a network address corresponding to the resource name according to the resource criteria data from a set of network addresses associated with the resource name in the name/network address data store.

8. The computer system of claim 7, wherein, in executing the resolution module, the computer system is further configured to:
    determine whether there is only one network address associated with the resource name; and
    return the only one network address irrespective of any resolution criteria in response to the network request when it is determined that there is only one network address associated with the resource name.

9. A computer-implemented method for providing DNS host services in resolving a text-descriptive resource name in a network request to a network address, the method comprising:
    obtaining a network request corresponding to a network resource on a computer network, the network request including a text-descriptive resource name corresponding to the network resource and further including resource criteria data, the resource criteria data including one or more operators and a plurality of directives for resolving the resource name to a network address;
    selecting a network address corresponding to the resource name according to the obtained resource criteria data by using the one or more operators to control how the plurality of directives are used to select the network address, the selecting being performed by a configured computer system; and
    returning the selected network address in response to the obtained network request, the returning being performed by the configured computer system.

10. The method of claim 9, wherein the resource criteria data included in the network request is appended to the network request as an argument.

11. The method of claim 9, wherein the one or more operators include a Boolean operator applicable to one or more directives of the plurality of directives for controlling the configured computer system in resolving the resource name to a network address.

12. The method of claim 9, wherein the one or more operators include a weighting operator applicable to a directive of the plurality of directives such that the weighted directive receives enhanced consideration in resolving the resource name to the network address.

13. The method of claim 9, wherein the resource criteria data includes a token identifying a predetermined set of resolution criteria located in a resolution criteria data store.

14. The method of claim 9, wherein selecting a network address corresponding to the resource name includes selecting a network address from a set of network addresses associated with the resource name located in a name/network address data store.

15. The method of claim 9 further comprising:
   determining whether there is only one network address corresponding to the resource name in a name/network address data store; and
   returning the only one network address corresponding to the resource name in response to the network request when it is determined that there is only one network address corresponding to the resource name.

16. A non-transitory computer-readable medium whose contents include computer-executable instructions which, when executed on a computing device communicatively coupled to a computer network, configures the computing device to perform a method for providing DNS host services in resolving a text-descriptive resource name in a network request to a network address, the method comprising:
   receiving a network request corresponding to a network resource on the computer network, the network request including a text-descriptive resource name and information corresponding to resource criteria for resolving the resource name to a network address, the information including one or more operators and a plurality of directives for resolving the resource name of the network resource to a network address;
   selecting a network address corresponding to the resource name according to the resource criteria by using the one or more operators to control how the plurality of directives are used to resolve the resource name to the selected network address; and
   returning the selected network address in response to the received network request.

17. An proxy system for controlling access to an external network for a plurality of client computing devices, the proxy system comprising:
   an proxy means through which network requests to a network resource in the external network flow; and
   a local network communicatively coupled to the proxy means and isolated from the external network by the proxy means and further coupled to a plurality of client computing devices;
   wherein the proxy means is configured to, upon receiving a network request for a network resource located on the external network from a client computing device, the network request comprising a text-descriptive resource name referencing the network resource:
      attach resolution criteria data to the network request for controlling the resolution of the text-descriptive resource name to a network address by a DNS host system; and
      forward the network request with the appended resource criteria data to a DNS host system.

18. The proxy system of claim 17, wherein the attached resolution criteria data comprises one or more directives for controlling the resolution of the text-descriptive resource name to a network address by a DNS host system.

19. The proxy system of claim 17, wherein the attached resolution criteria data is appended to the network request as an argument to the network request.

20. The proxy system of claim 17, wherein the resolution criteria data comprises a reference to a preconfigured set of resolution criteria available to a DNS host system.

21. The proxy system of claim 17, wherein the proxy means is further configured to, upon receiving the network request for the network resource, remove resolution criteria data attached to the network request by the administered client device.

22. The proxy system of claim 17, wherein the proxy means is further configured to, upon receiving the network request for the network resource, remove resolution criteria data attached to the network request by the administered client device that conflicts with the resolution criteria data to be attached by the proxy means.

23. A computer-implemented method for controlling the resolution of a text-descriptive resource name in a network request to a network address for a network resource from an administered client device, the method comprising:
   receiving a network request from the administered client device, the network request including a text-descriptive resource name for resolution by a DNS host system to a network address, the receiving being performed by a configured computing device;
   attaching resolution criteria data to the network request for controlling how the DNS host system resolves the resource name to a network address, the attaching being performed by the configured computing device; and
   forwarding the network request with the attached resolution criteria data to the DNS host system, the forwarding being performed by the configured computing device.

24. The method of claim 23, wherein the resolution criteria data attached to the network request comprises one or more directives for controlling the resolution of the resource name to a network address by a DNS host system.

25. The method of claim 23, wherein the attached resolution criteria data is appended to the network request as an argument to the network request.

26. The method of claim 23, wherein the resolution criteria data comprises a reference to a preconfigured set of resolution criteria available to a DNS host system.

27. The method of claim 23 further comprising, upon receiving the network request for the network resource, removing resolution criteria data already attached to the network request by the administered client device.

28. The method of claim 23 further comprising, upon receiving the network request for the network resource, removing resolution criteria data already attached to the network request by the administered client device that conflicts with the resolution criteria data to be attached to the network request.

* * * * *

UNITED STATES PATENT AND TRADEMARK OFFICE
CERTIFICATE OF CORRECTION

| | | |
|---|---|---|
| PATENT NO. | : 7,814,229 B1 | Page 1 of 1 |
| APPLICATION NO. | : 12/098393 | |
| DATED | : October 12, 2010 | |
| INVENTOR(S) | : Luis Felipe Cabrera et al. | |

It is certified that error appears in the above-identified patent and that said Letters Patent is hereby corrected as shown below:

Column 11, Line 67
"perform the selectins of the network address; and" should read, --perform the selecting of the network address; and--.

Signed and Sealed this
Fourteenth Day of June, 2011

David J. Kappos
*Director of the United States Patent and Trademark Office*